United States Patent Office 3,238,052
Patented Mar. 1, 1966

3,238,052
METHOD OF MAKING CALCIUM SILICATE MATERIALS
Nathan Burak, Prestwich, near Manchester, and Patrick McAnespie, Bold, near Widnes, England, assignors to Joseph Crosfield & Sons Limited, Warrington, England, a company of Great Britain
No Drawing. Filed Mar. 12, 1962, Ser. No. 179,202
Claims priority, application Great Britain, Mar. 14, 1961, 9,387/61
8 Claims. (Cl. 106—120)

This invention relates to silicate materials, more particularly to processes for the manufacture of silicate bodies. Although the invention is particularly suitable for the manufacture of heat insulation products, the process can also be used for the manufacture of other silicate bodies such as building boards, tiles and the like.

It has already been proposed to manufacture heat insulation materials by reacting lime and a naturally occurring siliceous material, such as diatomaceous earth, in the presence of steam under pressure. A number of manufacturing processes based on this reaction have been suggested for the manufacture of low density calcium silicate thermal insulation materials. Such suggested processes generally comprise the steps of heating an aqueous slurry of diatomaceous earth, hydrated lime and asbestos fibres to effect partial reaction between the lime and diatomaceous silica with the production of an expanded mass, shaping the expanded mass and then indurating it in an atmosphere of steam under presssure in an autoclave for several hours. In the induration stage, reaction between the lime and diatomaceous earth is completed. The hardened mass is then dried by heating it in air.

The present manufacture is concerned with the manufacture of silicate materials by processes involving interaction between lime and a siliceous material and has as a primary object to provide an improved process of this kind which avoids the use of an autoclave.

According to the present invention there is provided a process for the production of a silicate body comprising forming a reaction mixture by suspending in water lime and a reactive siliceous material, heating the reaction mixture above 65° C., including in the reaction mixture ions of at least one of the metals aluminum, nickel and zirconium in a concentration, based on the water content of the total reaction mixture, of more than 0.25 g. per litre, and drying the expanded mass produced.

The siliceous material employed in processes in accordance with the invention may be a natural or synthetic amorphous silica or silicate or mixtures thereof.

As examples of synthetic silicates which may be used in processes in accordance with the invention may be mentioned the synthetic hydrated calcium and sodium alumino silicates. These silicates may be prepared in finely-divided form by precipitation from an aqueous solution of sodium silicate or other alkali-metal silicate. For example, calcium silicate may be obtained by reacting aqueous solutions of sodium silicate and calcium chloride (or other soluble calcium salt). After filtering off the slurry of calcium silicate obtained, the filter cake should be washed to remove at least a substantial proportion of electrolytes. The wet precipitate may be used as such or, if it is not required for immediate use, it may be partially dried and, if desired, pulverised prior to storage.

Synthetic silicas may also be used in processes of the invention. These may be obtained by known precipitation techniques, for example by acidification of sodium silicate solutions. Finely-divided synthetic silicas (so-called fume silicas) obtained by burning silicon halides or organic silicon esters may also be used. Silica may also be employed in the form of the hydrosol, hydrogel, aerogel or finely-divided silica gel.

Examples of naturally occurring silicates which may be used in processes in accordance with the invention are the sodium alumino silicates of volcanic origin, for example expanded perlite, obsidian and other siliceous lavas, and also the microlytic zeolites or so-called regenerated clays. Sodium bentonite may also be used.

Silica occurring naturally as diatomaceous earth can also be used. Suitable earths are those having a specific surface area (measured by nitrogen adsorption) of at least 15, preferably at least about 20, square metres per gram, the density of the products produced tending to be lower as the higher surface area and more reactive earths are used. The earth should not contain substantial amounts of impurities.

The siliceous material used in the process of the invention should preferably be one relatively free of electrolytes since the presence of these tends to result in products which have relatively low compressive strengths after prolonged heating at high temperatures. Preferably the amount of any electrolyte present in the siliceous material should not exceed 3% by weight of the material and should be below about 1% to give the best results.

The concentration of ions based on the water content of the reaction mixture must be more than 0.25 gram per litre. The most suitable concentration of metal ions that should be used in any particular instance will be related to the reactivity of the siliceous material employed and the proportion of the siliceous material relative to the lime; the concentration of ions required may also depend on the properties desired in the final product. It has been found that a concentration of aluminum ions of 0.5 to 7.0 g. per litre is a suitable working range in most instances, a concentration of about 1.0 to 2.0 g. per litre generally being satisfactory for most purposes. The properties of the product obtained have been found to vary with the concentration of metal ions. When employing calcium silicate, for example, as the siliceous material, and aluminium ions, it was found that increase in the concentration of the aluminium ions tended to give products of increasing density when the silicate was in excess of the lime, whereas when excess of lime was employed, increase in the aluminium ion concentration tended to give products of decreasing density. The preferred metal ions incorporated in the suspension are those of aluminium. Zirconium and nickel ions give products of higher density and generally the ions of these metals must be present in higher concentrations than aluminium ions to give products of similar strengths. Preferably, zirconium and nickel ions are present in a concentration of more than 1 g. per litre.

As examples of suitable sources of the metal ions may be mentioned aluminium sulphate, zirconium sulphate, aluminium alums such as ammonium aluminium sulphate, and nickel ammonium sulphate.

The amount of water employed in the slurry can be varied over a wide range, larger amounts of water tending to give less dense products. Suitable amounts of water are from 3.5 to 25 times the combined dry weight of the lime, siliceous material and reinforcing fibres, if any. Products combining both good compressive strength and relatively low density have been obtained using a quantity of water equal to about 5 to 15 times the total dry weight of the lime, siliceous material and reinforcing fibre, if any.

The lime used in processes in accordance with the invention may be quicklime or powdered slaked lime or it may be in the form of a slurry of hydrated lime. The amount of lime is not critical although it is generally preferred to employ about the stoichiometric amount to react with the siliceous material to give calcium metasilicate.

An excess of siliceous material rather than an excess of lime is desirable since the latter tends to result in products with lower strengths after prolonged heating at high temperatures. Satisfactory results have been obtained using as the siliceous material calcium silicates having molecular ratios $CaO:SiO_2$ in the range of 1:3 to 1:7, the weight ratio of silicate to lime being between 1:5 and 4:1; the best products were, however, obtained, in general, when using about 2 to 3 parts of the silicate to 1 part of lime corresponding to molar ratios of $CaO:SiO_2$ in the range 1:1 to 1:2.

An amount of an alkali-metal hydroxide, for example sodium hydroxide, may be included in the suspending medium and may in some case assist the reaction between the metal ions and the suspended material.

Reinforcement of the final product may be effected by suitable fibrous materials. Suitable fibres are asbestos fibres, especially amosite fibres, other mineral fibres such as mineral wool, synthetic fibres and glass fibres. Amounts of up to about 50% based on the weight of the dry solids (lime, siliceous material and fibres) may be used, about 5 to 10% being a satisfactory amount for many purposes. It has been found desirable not to include any caustic soda in the process when glass fibres are used for the reinforcement. The fibres may be introduced before, during or after the formation of the expanded mass, dry or as a suspension in water.

In the process of the invention the reaction mixture is heated so as to produce an expanded mass. The higher the temperature the greater the expansion of the mass and consequently the less dense is the final product. By the choice of reaction temperature, control over the density of the final product is possible. The density of the product is also dependent on the reactivity of the siliceous material. The improvement in the strength of the dried expanded masses obtained by the inclusion of the metal ions, especially aluminium ions, in the reaction mixture, is obtained when the expanded mass is produced at reaction temperatures above about 65° C. The expanded masses produced above this temperature when the metal ions are omitted, on drying give products having little strength and requiring quite small forces completely to disintegrate them. It has been found that at reaction temperatures above about 65° C. increase in temperature results in final products of increasing strength whereas if the metal ions are omitted increase in the reaction temperature results in products of decreasing strength. The improvement obtained by including the metal ions in accordance with the invention is very marked when reaction temperatures above about 75 to 80° C. are employed.

In the process of the invention the best products are obtained by producing the metal ions from a sulphate or an alum.

Products which combine to a high degree both good compressive strength and low density can be made by heating the reaction mixture at from about 90 to 100° C., preferably above 95° C. The period of heating required to produce the expanded mass will be related to the reactivity of the siliceous material. With some materials heating for one minute at 97° C. was found sufficient whereas for others it was found that heating at this temperature for 15 minutes gave the best results. Even with the less reactive siliceous materials, heating at 90 to 100° C. for more than an hour was rarely necessary and in most cases the best results were obtained by heating for not more than about 30 minutes. The expanded masses produced when very highly reactive siliceous materials are used may require compression to increase the density and strength of the final product. With such materials it is preferred not to include a catalyst such as sodium hydroxide. The effect of the catalyst is to give products of lower density.

It will usually be found necessary to filter the expanded mass produced and this may be carried out either before or, preferably, as the mass is given the desired shape; if the mass is filtered before being shaped, then preferably the shaping operation follows soon after the filtration step. The manner of carrying out the filtration may depend on the particular moulding technique employed. For example, if it is required to produce a compressed shaped mass, then any filtering that may be necessary can be effected by shaping the mass in a piston press filter by means of which the expanded mass is compacted to the desired extent and at the same time water is expressed from the mass through water-permeable parts of the mould. The mass may also be filtered by means of a vacuum filter or centrifugal separator, for example. It has furthermore been found that the incorporation of aluminium, zirconium or nickel ions in the reaction mixture in accordance with the invention, enables products of satisfactory compressive strength to readily be produced without applying high compressive forces to the expanded mass prior to hardening, pressures less than about 3.5 kg./cm.² usually being sufficient.

The mass may be dried by heating it (after it has been given the desired shape) at or below atmospheric pressure at, for example, temperatures of from 100° to 400° C., temperatures of about 200° C. having been found to be particularly satisfactory. The actual period required for the drying will depend on the temperature used and may depend also on the size and shape of the body being dried, but generally heating at about 200° C. for one-half to two days is sufficient.

One particular method of performing the invention that has been found especially convenient is as follows. A slurry is first prepared by adding a mixture of lime and siliceous material to a solution of an aluminium, zirconium or nickel salt of appropriate concentration, preferably heated to 80 to 85° C. The reaction mixture is agitated and heated to 97 to 100° C. and after the reaction mixture has been transformed into a thick expanded mass, reinforcing fibres are gradually stirred in. The expanded mass is then filtered and shaped, with slight compression if desired, and finally hardened and dried by heating in air at about 200 to 300° C. A partial drying can be effected by first allowing the mass to stand in air. The various reactants may, however, be mixed together in other ways and simple trial will determine the best method in any particular instance. It has been found that, in some cases, the order of addition of the ingredients affects the properties of the final product. It may be mentioned here, that dry mixtures of lime and siliceous material should not be left exposed to air for long periods before use as this may result in unsatisfactory products being obtained.

The expanded mass may, if desired, include additives or diluents which may be incorporated before, during or after the production of the mass. Suitable additives or diluents are Portland cement, china clay or powdered sand; natural and synthetic calcium silicates having a $CaO:SiO_2$ ratio of about 1:1, such as wollastonite, may also be included. Thus, for example, a substantial part such as 50% or even more of the combined weights of the siliceous material and lime may be replaceable by, for example, Portland cement to produce products of higher density.

By processes in accordance with the invention it is possible to prepare a wide range of products of varying densities and strengths. The invention is especially applicable to the production of materials having densities in the range 140 to 400 kg./m.³ (kilograms per cubic metre) and higher and compressive strengths (as defined hereinafter) in the range 2.5 to 52.5 kg./cm.² (kilograms per square centimetre). The products especially suitable as thermal insulation materials are those having densities of not more than 280 kg./m.³ and preferably compressive strengths of at least 5.0 kg./cm.². For other applications denser materials may be required. In most cases the products of the invention have a lower compressive strength after prolonged heating at high temperatures, such as at 650° C. for 24 hours. Products which do, however, retain a relatively good compressive strength after subjection to high temperatures for prolonged periods, even after heating at temperatures as high as about 980° C. are those produced using perlite as the siliceous material. The preferred products of this kind are those obtained using as the siliceous material a mixture of perlite and a calcium silicate having a $CaO:SiO_2$ ratio of from 1:3–1:7. Suitable mixtures are those containing 0.5 to 2 parts of perlite per part by weight of calcium silicate. Reference in this specification to the compressive strength of a product of the invention, is to be understood to mean the pressure required to reduce the thickness of a sample of the material by one-sixth.

The following examples illustrate the invention. At the end of the examples values are given for the compressive strength (as previously defined) of the respective products obtained both before and after heating at 650° C. for 24 hours. The manner in which the measurement of the compressive strength was made is described after the examples.

*Example 1*

60. g. of aluminium sulphate hydrate $$(Al_2(SO_4)_3.16H_2O)$$

were first dissolved in 3 litres of water, the concentration of aluminium ions being 1.72 g. per litre. The solution was then heated to 80° C. and a dry intimate mixture consisting of 240 g. of a synthetic precipitated hydrated calcium silicate (molecular composition $CaO.4.25SiO_2$; specific surface area about 50 square metres per gram) having an electrolyte content of less than 1% as chloride plus sulphate, 120 g. of hydrated lime $(Ca(OH)_2)$, 10 g. of sodium hydroxide powder, was added with high speed mechanical agitation to form a suspension. The reaction was carried out in a 5 litre glass beaker heated by a hotplate. The temperature of the aqueous slurry was allowed to rise to 92° C. when the speed of agitation was reduced to about 60 r.p.m. The temperature was further increased to 97° C. and was maintained at 97° C.±2° C. for 15 minutes when heating was discontinued. By this time a reaction had occurred transforming the mixture into a thick expanded mass. Into the mass 40 g. of fully opened asbesetos fibres were introduced with slow stirring until the fibres were evenly dispersed; this took about 10 minutes. The mass was then transferred to a filtration apparatus which was in the form of a mould. A cylindrical shaped body was moulded by employing a 16.2 cm. diameter Buchner type funnel into which was tightly fitted a metal cylinder open at both ends so as to accommodate cake volumes giving up to a 15.25 cm. diameter by 25.4 cm. body. Filtration was carried out by means of a vacuum pump attached to the filter flask into the neck of which the filter funnel had been placed. As filtration proceeded the cake was lightly pressed on the upper surface by manual means so as to fill out the mould and to exclude air pockets. The pressure in the vacuum filter flask during the filtration was initially about 400 mm. of Hg and this rose to about 630 mm. of Hg when no more water drained from the cake. When filtration was complete, the resultant cake contained about 20% solids (equivalent to the removal of approximately one litre of water). The cake was then removed from the filter mould and hardened and dried in air in a well ventilated oven at 200° C. for from 24 to 48 hours till constant weight. The product obtained had a density of 206 kg./m.$^3$ and a compressive strength of 10.7 kg./cm.$^2$; after heating at 650° C., the compressive strength was 8.2 kg./cm.$^2$.

To determine the reproducibility of the process described, this example was repeated five times. The products obtained had densities ranging between about 200 and 250 kg./m.$^3$. The compressive strengths of the products before heating ranged from about 7.5 to 13.2 kg./cm.$^2$; after heat treatment at 650° C., the compressive strengths ranged from about 5.0 to 9.2 kg./cm.$^2$.

*Example 2*

The same procedure as described in Example 1 was followed until the filtration was completed. The cake was then removed from the filter mould and placed in a more robust metal mould consisting of two semi-cylindrical halves each perforated over the whole surface with holes of diameter about 0.3 cm. and centres spaced apart by about 1.0 cm. The two halves were bolted together through lugs attached to the straight edges of the separate halves. This mould was lined with a suitable filter system such as nylon cloth. The mould stood on a filter cloth on a perforated plate which rested on a grooved plate. The mould was 15.25 cm. in diameter and about 10 cm. deep. The mould containing the filter cake was placed between the plattens of a hydraulic press and since the filter cake was about 10.8 cm. deep is projected slightly out of the top of the mould. One or more steel blanking plates of just under 15.25 cm. diameter and about 1.25 cm. thick were then placed centrally on top of the projecting filter cake so that when the press was closed the blank steel plates acted as a piston to compress the cake into the mould to give a final cake of about 9.4 cm. depth. During this compressive process, water was forced out of the cake through the sides of the mould and also from the edges of the grooved plate under the bottom of the cake. The pressure applied to the filter cake was about 2.8 kg./cm.$^2$. The resultant body was removed from the mould and was hardened and dried as described in Example 1 and allowed to reach equilibrium weight as before. The product obtained had a bulk density of 235 kg./m.$^3$ and a compressive strength of 15.5 kg./cm.$^2$; after heating at 650° C., the compressive strength was 11.4 kg./cm.$^2$.

By the method described, products having bulk densities of 223 kg./m.$^3$ and 295 kg./m.$^3$ were obtained by compressing the filter cake to thicknesses of about 10.2 cm. and 7.4 cm., respectively, the pressures needed to give cakes of these thicknesses being, respectively, about 2.1 kg./cm.$^2$ and about 7.0 kg./cm.$^2$.

*Examples 3, 4, 5 and 6*

The procedures of these examples were the same as that of Example 1 except that the volume of water employed was varied. The results are tabulated below:

| Example | Volume of water, litres | Density of Product, kg./m.$^3$ | Compressive Strength of Product, kg./cm.$^2$ | Compressive Strength after heating at 650° C., kg./cm.$^2$ |
|---|---|---|---|---|
| 3 | 1.5 | 352 | 47.1 | 6.4 |
| 4 | 2.0 | 267 | 9.8 | 4.4 |
| 5 | 6.0 | 200 | 12.4 | 6.6 |
| 6 | 9.0 | 184 | 7.0 | 7.0 |

*Examples 7, 8 and 9*

The procedure of each of these examples was the same as that of Example 1 except that the quantity of asbestos incorporated was varied while maintaining the combined weight of asbestos fibres, calcium silicate and lime at 400 g. and the weight of silicate double that of the lime. The results are tabulated below:

| Example | Wt. of Asbestos, g. | Density of Product, kg./m.$^3$ | Compressive Strength of Product, kg./cm.$^2$ | Compressive Strength after heating at 650° C., kg./cm.$^2$ |
|---|---|---|---|---|
| 7 | 20 | 243 | 19.3 | 7.9 |
| 8 | 80 | 256 | 19.0 | 6.2 |
| 9 | 160 | 305 | 15.5 | 12.4 |

Example 10

The method of this example was similar to that of Example 2 except that the caustic soda was initially dissolved in the water and the aluminium sulphate was added together with the dry powders at 80° C. The compressed filter cake had a depth of about 9.7 cm. The product obtained had a density of 238 kg./m.$^3$ and a compressive strength of 11.6 kg./cm.$^2$; after heating at 650° C., the compressive strength was 3.5 kg./cm.$^2$.

Example 11

The method of this example was similar to that of Example 2 except that both the aluminium sulphate and the caustic soda were initially added to the water. This was equivalent to the addition of the dry powders to a freshly prepared suspension or gel of aluminium hydroxide in an approximately 0.6% by weight solution of aluminium sulphate at 80° C. The compressed filter cake had a depth of about 9.7 cm. The product obtained had a density of 240 kg./m.$^3$ and a compressive strength of 21.1 kg./cm.$^2$; after heating at 650° C., the compressive strength was 7.0 kg./cm.$^2$.

Example 12

The method of this example was similar to that of Example 1 except that the aluminium sulphate and caustic soda were initially added to the water together with the calcium silicate followed by the lime at 80° C. The product obtained had a density of 272 kg./m.$^3$ and a compressive strength of 19.7 kg./cm.$^2$; after heating at 650° C., the compressive strength was 10.7 kg./cm.$^2$.

Example 13

The method of this example was the same as that of Example 1 except that all the materials were added to the water at the start, the temperature of the mixture was then raised at about 2° C. per minute to 97° C. and after the 15 minutes heating period the asbestos fibre was added. The product obtained had a density of 280 kg./m.$^3$ and a compressive strength of 14.1 kg./cm.$^2$; after heating at 650° C., the compressive strength was 9.3 kg./cm.$^2$.

Example 14

The method of this example was the same as that of Example 2 except that a mixture of the calcium silicate and lime was added to the water initially, and that the aluminium sulphate and caustic soda were added as dry solids when the temperature reached 80° C. The compressed filter cake had a depth of about 9.9 cm. The product obtained had a density of 221 kg./m.$^3$ and a compressive strength of 8.8 kg./cm.$^2$; after heating at 650° C., the compressive strength was 3.0 kg./cm.$^2$.

Example 15

The method of this example was similar to that of Example 14 except that the aluminium sulphate and caustic soda were added consecutively as aqueous solutions when the reaction mixture had reached 80° C., the total volume of the slurry still being 3 litres as before. The compressed filter cake had a depth of about 9.9 cm. The product obtained had a density of 250 kg./m.$^3$ and a compressive strength of 21.8 kg./cm.$^2$; after heating at 650° C., the compressive strength was 8.6 kg./cm.$^2$.

Example 16

The method of this example was the same as that of Example 1 except that the aluminium sulphate powder was added at 80 °C., the caustic soda having been added together with the calcium silicate and lime initially to the water. The product obtained had a density of 264 kg./m.$^3$ and a compressive strength of 18.0 kg./cm.$^2$; after heating at 650° C., the compressive strength was 13.1 kg./cm.$^2$.

Example 17

The procedure of this example was similar to that of Example 2 except that the asbestos fibre was added to the water at the start of the process. The compressed filter cake had a depth of about 9.9 cm. The product obtained had a density of 224 kg./m.$^3$ and a compressive strength of 26.3 kg./cm.$^2$; after heating at 650° C., the compressive strength was 9.9 kg./cm.$^2$.

Example 18

The method of Example 1 was repeated but instead of hardening and drying at 200° C. the cake was heated at 100° C. for six days. A total of five experiments were carried out in this way giving products having a mean density of 235 kg./cm.$^3$ and a mean compressive strength before heating of 15.8 kg./cm.$^2$; after heating at 650° C., the products had a mean compressive strength of 11.1 kg./cm.$^2$.

Example 19

60 g. of ammonium aluminium sulphate hydrate $(NH_4)Al(SO_4)_2.12H_2O$ were first dissolved in 3 litres of water at 70° C., giving an aluminium ion concentration of 1.19 g. per litre. 240 g. of calcium silicate (the same as that used in Example 1) were then added and the whole agitated for 15 minutes. The temperature was then raised to 80° C. and 120 g. of lime and 10 g. of caustic soda were added. The following steps in the process were the same as those employed in Example 2. The compressed filter cake had a depth of about 9.4 cm. The product obtained had a density of 243 kg./m.$^3$ and a compressive strength of 16.3 kg./cm.$^2$; after heating at 650° C., the compressive strength was 10.4 kg./cm.$^2$.

Example 20

60 g. of zirconium sulphate hydrate $Zr(SO_4)_2.4H_2O$ were dissolved in 3 litres of water at 70° C., giving a zirconium ion concentration of 5 g. per litre. 240 g. of calcium silicate (the same as that used in Example 1) were then added and the whole agitated for 15 minutes. The temperature was then raised to 80° C. and 120 g. of lime and 10 g. of caustic soda were added. The subsequent steps in the process were the same as those employed in Example 1. The product obtained had a density of 291 kg./m.$^3$ and a compressive strength of 11.1 kg./cm.$^2$; after heating at 650° C., the compressive strength was 6.6 kg./cm.$^2$.

Example 21

The method of this example was similar to that of Example 2 except that the calcium silicate employed had been taken out of its production process before it had been pulverized. It was then in the form of a dry powder containing aggregates of its ultimate particles larger than those present in the pulverized material used in the process of Example 2. The filter cake was compressed to a depth of about 9.8 cm. The product obtained had a density of 251 kg./m.$^3$ and a compressive strength of 29.7 kg./cm.$^2$; after heating at 650° C., the compressive strength was 15.2 kg./cm.$^2$.

Example 22

The calcium silicate employed in this example had been taken out of its production process as a washed filter cake. This contained approximately 20% solids, the rest being water. Consequently a weight of the cake was taken containing the equivalent of 240 g. of calcium silicate as the final product. This was dispersed in a further 2300 ml. of water. This suspension was heated to 80° C. with agitation and 60 g. of aluminium sulphate hydrate was added. After a further 5 minutes 120 g. lime and 10 g. of caustic soda were added and thereafter the method was the same as that of Example 2. The filter cake was compressed to a depth of about 9.9 cm. The product obtained had a density of 238 kg./m.$^3$ and a compressive strength of 12.4 kg./cm.$^2$; after heating at 650° C., the compressive strength was 9.6 kg./cm.$^2$.

Example 23

The procedure of this example was similar to that employed in Example 1 except that 180 g. of calcium silicate and 180 g. of hydrated lime were used instead of 240 g. and 120 g., respectively, and the weight of aluminium sulphate was 120 g. The product obtained had a density of 235 kg./m.$^3$ and a compressive strength of 11.0 kg./cm.$^2$; after heating at 650° C., the compressive strength was 5.9 kg./cm.$^2$.

Example 24

The procedure of this example was similar to that employed in Example 1 except that 270 g. calcium silicate and 90 g. of hydrated lime were used instead of 240 g. and 120 g. respectively. The product obtained had a density of 233 kg./m.$^3$ and a compressive strength of 14.8 kg./cm.$^2$; after heating at 650° C., the compressive strength was 10.5 kg./cm.$^2$.

Example 25

The procedure of this example was similar to that of Example 1 except that 288 g. calcium silicate and 72 g. hydrated lime were used instead of 240 g. and 120 g., respectively. The product obtained had a density of 221 kg./m.$^3$ and a compressive strnegth of 9.5 kg./cm.$^2$; after heating at 650° C., the compressive strength was 6.8 kg./cm.$^2$.

Example 26

The procedure of this example was similar to that of Example 1 except that 120 g. calcium silicate and 240 g. hydrated lime were used instead of 240 g. and 120 g., respectively and the weight of aluminium sulphate hydrate was 120 g. The product obtained had a density of 251 kg./m.$^3$ and a compressive strength of 16.5 kg./cm.$^2$; after heating at 650° C., the compressive strength was 11.6 kg./cm.$^2$.

Example 27

The procedure of this example was similar to that of Example 1 except that 60 g. of calcium silicate and 300 g. hydrated lime were used instead of 240 g. and 120 g., respectively, and the weight of aluminium sulphate hydrate was 120 g. The product obtained had a density of 275 kg./m.$^3$ and a compressive strength of 8.2 kg./cm.$^2$; after heating at 650° C., the compressive strength was 3.5 kg./cm.$^2$.

Example 28

The procedure of this example was similar to that of Example 2 except that a synthetic precipitated hydrated calcium silicate was used containing about 3% electrolyte as sodium chloride. The filter cake was compressed to a depth of about 9.9 cm. The product obtained had a density of 219 kg./m.$^3$ and a compressive strength of 18.7 kg./cm.$^2$. However, after heating at 650° C., the compressive strength was poor (0.8 kg./cm.$^2$).

Example 29

The procedure of this example was similar to that of Example 28 except that the calcium silicate was washed free of electrolytes with distilled water before carrying out the reaction. The filter cake was compressed to a depth of about 9.0 cm. The product obtained had a density of 226 kg./m.$^3$ and a compressive strength of 10.3 kg./cm.$^2$. The compressive strength after heating at 650° C. was much improved (4.9 kg./cm.$^2$).

Example 30

The procedure of this example was similar to that of Example 2 except that a portion of the calcium silicate and lime was replaced by Portland cement. Thus, 220 g. of calcium silicate, 100 g. of hydrated lime and 40 g. of Portland cement were used instead of 240 g. of calcium silicate and 120 g. of lime. The filter cake was compressed to a depth of about 9.4 cm. The product obtained had a density of 238 kg./m.$^3$ and a compressive strength of 11.8 kg./cm.$^2$; after heating at 650° C., the compressive strength was 9.8 kg./cm.$^2$.

Example 31

The procedure of this example was similar to that of Example 1 except that 120 g. of calcium silicate, 60 g. of hydrated lime and 180 g. of an air separated china clay were used instead of 240 g. of calcium silicate and 120 g. of hydrated lime. The product obtained had a density of 349 kg./m.$^3$ and a compressive strength of 26.6 kg./cm.$^2$; after heating at 650° C., the compressive strength was 25.9 kg./cm.$^2$.

Example 32

The procedure of this example was identical with that of Example 2 except that 160 g. of calcium silicate, 60 g. of hydrated lime and 120 g. of perlite (a natural sodium alumino silicate of volcanic origin) having a bulk density of 48 kg./m.$^3$ were used in the reaction instead of 240 g. of calcium silicate and 120 g. of lime. The filter cake was compressed to a depth of about 7.6 cm. The product obtained had a density of 227 kg./m.$^3$ and a compressive strength of 11.3 kg./cm.$^2$; after heating at 650° C. and 980° C., the compressive strengths were 7.8 and 2.8 kg./cm.$^2$ respectively.

Example 33

The procedure of Example 2 was repeated using, instead of the calcium silicate, the same weight of a precipitated synthetic hydrated aluminium silicate (electrolyte content less than 3% by weight) having an ultimate particle size of 45–50 millimicrons and a specific surface area of 60 square metres per gram. The filter cake was compressed to a depth of about 10.4 cm. The product obtained had a density of 194 kg./cm.$^3$ and a compressive strength of 20.7 kg./cm.$^2$; after heating at 650° C., the compressive strength was 8.3 kg./cm.$^2$.

Example 34

The procedure of Example 2 was repeated using, instead of the calcium silicate, the same weight of a precipitated synthetic hydrated silica having an ultimate particle size between 15 and 200 millimicrons and a specific surface area of between 80 and 250 square metres per gram. The filter cake was compressed to a depth of about 10.2 cm. The product obtained had a density of 200 kg./m.$^3$ and a compressive strength of 8.8 kg./cm.$^2$; after heating at 650° C., the compressive strength was 6.4 kg./cm.$^2$.

Example 35

The procedure of Example 2 was repeated using, instead of the calcium silicate, the same weight of a micronised silica gel having a particle size of 3 to 6 microns and a specific surface area of from 200 to 400 square metres per gram. The filter cake was compressed to a depth of about 9.9 cm. The product obtained had a density of 248 kg./m.$^3$ and a compressive strength of 10.7 kg./cm.$^2$; after heating at 650° C., the compressive strength was 4.2 kg./cm.$^2$.

Example 36

The procedure of Example 2 was repeated using, instead of the calcium silicate, half the weight of a fume silica having an ultimate particle size between 3 and 40 millimicrons and a specific surface area of 175 to 400 square metres per gram and half the weight of the lime and asbestos fibres was also used. The filter cake was compressed to a depth of about 5.7 cm. The product obtained had a density of 202 kg./m.$^3$ and a compressive strength of 10.7 kg./cm.$^2$; after heating at 650° C., the compressive strength was 6.3 kg./cm.$^2$.

Example 37

The procedure of Example 2 was repeated using, instead of the calcium silicate, the same weight of a diatomaceous earth having a specific surface area of about 40 square metres per gram. The filter cake was compressed to a depth of about 9.9 cm. The product obtained had a density of 219 kg./m.$^3$ and a compressive strength of 28.1 kg./cm.$^2$; after heat treatment at 650° C., the compressive strength was 26.7 kg./cm.$^2$.

*Example 38*

The procedure of Example 2 was repeated using, instead of the calcium silicate, the same weight of perlite (a naturally occurring sodium alumino silicate of volcanic origin) having a bulk density of 48 kg./m.$^3$. The filter cake was compressed to a depth of about 9.4 cm. The product obtained had a density of 251 kg./m.$^3$ and a compressive strength of 14.9 kg./cm.$^2$; after heating at 650° C., the compressive strength was 9.1 kg./cm.$^2$.

*Example 39*

The procedure of Example 1 was repeated using, instead of the calcium silicate, the same weight of a diatomaceous earth having a specific surface area of about 40 square metres per gram. The product obtained had a density of 194 kg./m.$^3$ and a compressive strength of 8.8 kg./cm.$^2$; after heating at 650° C., the compressive strength was 9.3 kg./cm.$^2$.

*Example 40*

The procedure of Example 1 was repeated using, instead of the calcium silicate, the same weight of a diatomaceous earth having a specific surface area of about 20 square metres per gram. The product obtained had a density of 276 kg./m.$^3$ and a compressive strength of 19.0 kg./cm.$^2$; after heating at 650° C., the compressive strength was 13.2 kg./cm.$^2$.

*Example 41*

The procedure of Example 1 was repeated using, instead of calcium silicate, the same weight of a naturally occurring sodium bentonite. The product obtained had a density of 346 kg./m.$^3$ and a compressive strength of 20.4 kg./cm.$^2$; after heating at 650° C., the compressive strength was 11.7 kg./cm.$^2$.

*Example 42*

The procedure of this example was the same as that of Example 2 except that, instead of using 240 g. of calcium silicate and 120 g. of lime, there were used 180 g. of lime and 180 g. of a synthetic precipitated hydrated silica having an ultimate particle size of 100 to 200 millimicrons and a bulk density of 112 kg./m.$^3$. The filter cake was compressed to a depth of about 10.2 cm. The product obtained had a density of 218 kg./m.$^3$ and a compressive strength of 17.3 kg./cm.$^2$; after heating at 650° C., the compressive strength was 14.3 kg./cm.$^2$.

*Example 43*

The procedure of this example was the same as that of Example 1 except that, instead of using 240 g. of calcium silicate and 120 g. of lime, 180 g. of a diatomaceous earth having a specific surface area of about 40 square metres per gram and 180 g. of lime were used. The product obtained had a density of 296 kg./m.$^3$ and a compressive strength of 40.5 kg./cm.$^2$; after heating at 650° C., the compressive strength was 23.9 kg./cm.$^2$.

*Example 44*

The procedure of this example was the same as that of Example 2 save in that the calcium silicate employed was one having the molecular composition CaO:4.0 SiO$_2$, an ultimate particle size of about 30 to 50 millimicrons and a specific surface area of about 80 square metres per gram; the silicate had an electrolyte content of less than 1% as chloride plus sulphate. The filter cake was compressed to a depth of about 10.4 cm. The product obtained had a density of 208 kg./m.$^3$ and a compressive strength of 37.3 kg./cm.$^2$; after heating at 650° C., the compressive strength was 18.4 kg./cm.$^2$.

*Example 45*

The procedure of this example was similar to that used in Example 2 except that in place of the synthetic precipitated hydrated calcium silicate, the same weight of a regenerated clay (so-called microlitic zeolite) having an ultimate particle size of 20 to 30 millimicrons and a specific surface area of about 70 square metres per gram, was employed. The filter cake was compressed to a depth of about 10.2 cm. The product obtained had a density of 205 kg./m.$^3$ and a compressive strength of 12.5 kg./cm.$^2$. After heating at 650° C., however, this product had a low compressive strength (1.8 kg./cm.$^2$).

*Example 46*

The procedure of this example was similar to that used in Example 2 but in place of the calcium silicate a freshly made silica hydrosol was used. The hydrosol was made by the addition of sufficient dilute hydrochloric acid to neutralise the Na$_2$O content of a solution of sodium silicate (having a Na$_2$O:SiO$_2$ weight ratio of 1:3.3) containing the equivalent of 240 g. SiO$_2$. The volume of acid used was adjusted to 1 litre and the sodium silicate solution had been diluted to 2 litres before carrying out the reaction. A further 2 litres of water at 80° C. was added after the completion of the acid addition. The mixture was vigorously agitated and heated rapidly to 80° C., 60 g. aluminium sulphate hydrate were added followed rapidly by 120 g. hydrated lime containing 10 g. caustic soda. The sol had already partially gelled before the addition of the aluminium sulphate; the production of a stiff gel was prevented by the vigorous agitation. The process was then continued as described in Example 2. The filter cake was compressed to a depth of about 10.2 cm. The product obtained had a density of 221 kg./m.$^3$ and a compressive strength of 13.9 kg./cm.$^2$. The product of this example had, however, a relatively low compressive strength (2.0 kg./cm.$^2$) after heating at 650° C.

*Example 47*

The procedure of this example was the same as that of Example 2 save in that no sodium hydroxide was included in the reaction mixture. The filter cake was compressed to a depth of about 9.7 cm. The product obtained had a density of 237 kg./m.$^3$ and a compressive strength of 24.6 kg./cm.$^2$; after heating at 650° C., the compressive strength was 10.0 kg./cm.$^2$.

*Example 48*

The procedure of this example was the same as that of Example 2 save in that no sodium hydroxide was included in the reaction mixture and, instead of calcium silicate, the same weight of a synthetic precipitated hydrated aluminium silicate (electrolyte content less than 3% by weight), having an ultimate particle size of 45 to 50 millimicrons and a specific surface area of about 60 square metres per gram, was used. The filter cake was compressed to a depth of about 9.9 cm. The product obtained had a density of 219 kg./m.$^3$ and a compressive strength of 9.0 kg./cm.$^2$; after heating at 650° C., the compressive strength was 6.5 kg./cm.$^2$.

*Example 49*

The procedure of this example was similar to that of Example 2 except that no sodium hydroxide was included in the reaction mixture and instead of the calcium silicate, the same weight of a micronised silica gel, having a particle size of 3 to 6 microns and a specific surface area of from 200 to 400 square metres per gram, was used. The filter cake was compressed to a depth of about 10.2 cm. The product obtained had a density of 211 kg./m.$^3$ and a compressive strength of 12.0 kg./cm.$^2$; after heating at 650° C., the compressive strength was 11.0 kg./cm.$^2$.

*Example 50*

The procedure of this example was the same as that of Example 2, save in that no sodium hydroxide was included in the reaction mixture and instead of the calcium silicate, the same weight of a diatomaceous earth having a specific surface area of about 40 square metres per gram, was used. The filter cake was compressed to a depth of about 9.8 cm. The product obtained had a density of 254 kg./m.$^3$ and a compressive strength of 21.0 kg./cm.$^2$; after heating at 650° C., the compressive strength was 18.3 kg./cm.$^2$.

*Example 51*

The procedure of this example was the same as that of Example 2, save in that no sodium hydroxide was included in the reaction mixture and instead of the calcium silicate, the same weight of perlite (a naturally occurring sodium alumino silicate of volcanic origin), having a bulk density of 48 kg./m.$^3$, was used. The filter cake was compressed to a depth of about 10.2 cm. The product obtained had a density of 216 kg./m.$^3$ and a compressive strength of 12.5 kg./cm.$^2$; after heating at 650° C., the compressive strength was 11.0 kg./cm.$^2$.

*Example 52*

The procedure of this example was the same as that of Example 2, save in that no sodium hydroxide was included in the reaction mixture and instead of the calcium silicate, the same weight of a fume silica, having an ultimate particle size between 3 and 40 millimicrons and a specific surface area of 175 to 400 square metres per gram, was used. The filter cake was compressed to a depth of about 5.3 cm. The product obtained had a density of 235 kg./m.$^3$ and a compressive strength of 14.1 kg./cm.$^2$; after heating at 650° C., the compressive strength was 9.8 kg./cm.$^2$.

*Example 53*

The procedure of this example was the same as that of Example 2 except that no sodium hydroxide was employed and, instead of using 240 g. of calcium silicate and 120 g. of hydrated lime, 180 g. of a synthetic precipitated hydrated silica having an ultimate particle size of 20 to 30 millimicrons and a bulk density of 112 kg./m.$^3$, and 180 g. of hydrated lime was used. The product obtained had a density of 216 kg./m.$^3$ and a compressive strength of 17.3 kg./cm.$^2$; after heating at 650° C., the compressive strength was 16.5 kg./cm.$^2$.

*Example 54*

The procedure of this example was identical with Example 1 except that 40 g. of glass wool was incorporated in place of the asbestos fibre and no sodium hydroxide was included in the reaction mixture. The product obtained had a density of 315 kg./m.$^3$ and a compressive strength of 19.7 kg./cm.$^2$; after heating at 650° C., the compressive strength was 13.0 kg./cm.$^2$.

*Example 55*

The procedure of this example was identical with Example 1 except that 40 g. of glass wool was incorporated in place of the asbestos fibre. The product obtained had a density of 298 kg./m.$^3$ and a compressive strength of 20.0 kg./cm.$^2$. However, the product had, compared with that of Example 54, a lower compressive strength (3.5 kg./cm.$^2$).

*Example 56*

The procedure of this example was identical to Example 1 except that 40 g. of rock wool was incorporated in place of the asbestos fibre and no sodium hydroxide was included in the reaction mixture. The product obtained had a density of 283 kg./m.$^3$ and a compressive strength of 10.5 kg./cm.$^2$; after heating at 650° C., the compressive strength was 8.6 kg./cm.$^2$.

*Example 57*

The procedure of this example was identical with Example 1 except that 40 g. of rock wool was incorporated in place of the asbestos fibre. The product obtained had a density of 240 kg./m.$^3$ and a compressive strength of 11.2 kg./cm.$^2$; after heating at 650° C., the compressive strength was 9.3 kg./cm.$^2$.

*Example 58*

The procedure of this example was identical with that of Example 56 except that after completing the reaction at the boil for 15 minutes the mixture was allowed to stand for 90 minutes without either heating or stirring. The mixture was then strongly agitated and the rock wool added. The resultant uncompressed cake had a depth of 13.3 cm. as compared with about 9 cm. when the fibre was added as in Example 56. The product obtained had a density of 205 kg./m.$^3$ and a compressive strength of 8.1 kg./cm.$^2$; after heating at 650° C., the compressive strength was 3.2 kg./cm.$^2$.

*Example 59*

The method of this example was identical with that of Example 1 except that 60 g. of nickel ammonium sulphate hydrate $(NH_4)_2.SO_4.NiSO_4.6H_2O$ was used in place of aluminium sulphate, giving a concentration of nickel ions of 3 g. per litre. The product obtained had a density of 312 kg./m.$^3$ and a compressive strength of 32.0 kg./cm.$^2$; after heating at 650° C., the compressive strength was 11.5 kg./cm.$^2$.

*Example 60*

The procedure of this example was the same as that employed in Example 1 except that the weight of aluminium sulphate hydrate was 30 g. instead of 60 g., giving a concentration of aluminium ions in the slurry of 0.86 g. per litre. The product obtained had a density of 261 kg./m.$^3$ and a compressive strength of 15.4 kg./cm.$^2$; after heating at 650° C., the compressive strength was 6.2 kg./cm.$^2$.

The compressive strength of the products of the examples was determined as follows:

The apparatus used in the compression test was that described in British standard specification 903, part A.6, 1957, for the measurement of the compression set of vulcanised rubber. This apparatus is recommended for the testing of thermal insulation material in British standard 2972, 1961. The apparatus consisted of two horizontal circular parallel plattens, the lower platten being motivated by a calibrated spring in such manner that a 2.54 cm. (1 inch) depression of the spring was equivalent to an applied load of 28.12 kg./cm.$^2$ (400 lbs./sq. in.). The pressure was brought to bear on the specimen by turning a screw attached to a yoke which pressed down on the top platten thus squeezing the specimen between the two plattens against the compression of the spring.

In each measurement a test sample accurately cut to a size of 2.54 cm. x 2.54 cm. x 1.524 cm. deep (1 in. x 1 in. x 0.6 in. deep) was placed between the plattens, and along side the specimen was placed a steel block 2.54 cm. x 2.54 cm. x 1.27 cm. deep (1 in. x 1 in. x 0.5 in. deep). The test sample was then compressed between the plattens until the surface of the upper platten just came into contact with the steel block and no daylight was visible through the gap between the steel block and the upper platten. In this manner the test sample was compressed from the thickness of 1.254 cm. (0.6 in.) to one of 1.27 cm. (0.5 in.) and the load required to do this was then read from the calibrated scale which was fixed to the compression set apparatus at the side of the plattens.

What is claimed is:

1. In a process for the production of a silicate body from a reaction mixture of lime and a reactive siliceous material in a weight ratio of silica:lime between about 1:5 and 4:1 suspended in water, the improvement which comprises heating the reaction mixture at atmospheric pressure to a temperature between about 65° C. and about 100° C. and including in the reaction mixture an aluminium compound selected from the group consisting of aluminium sulphate and aluminium alums, said compound being included in the reaction mixture in an amount sufficient to give, in the water of the total reaction mixture, a concentration of aluminium ions of 0.5 to 7 g. per litre, whereby an expanded mass is produced, and drying the expanded mass produced.

2. In a process for the production of a silicate body from a reaction mixture of lime and a reactive siliceous material in a weight ratio of silica:lime between about 1:5 and 4:1 suspended in water, the improvement which comprises heating the reaction mixture at atmospheric pressure to a temperature between about 65° C. and about 100° C. and including in the reaction mixture a water soluble compound of at least one of the metals selected from the group consisting of aluminium, nickel and zirconium, said compound being selected from the group consisting of sulphates and alums, and said compound being included in the reaction mixture in an amount sufficient to give, in the water of the total reaction mixture, a concentration of metal ions of more than 0.25 g. per litre; whereby an expanded mass is produced, and drying the expanded mass produced.

3. In a process for the production of a silicate body from a reaction mixture of lime and a reactive siliceous material in a weight ratio of silica:lime between about 1:5 and 4:1 suspended in water, the improvement which comprises heating the reaction mixture at atmospheric pressure between about 65° and 100° C., and including in the reaction mixture ions of at least one of the metals selected from the group consisting of aluminium, nickel and zirconium in a concentration, based on the water content of the total reaction mixture, of more than 0.25 g. per litre, whereby an expanded mass is produced, and drying the expanded mass produced.

4. A process as claimed in claim 3, wherein the siliceous material is a mixture of perlite and a synthetic amorphous calcium silicate having a molecular $CaO:SiO_2$ ratio of between 1:3 and 1:7.

5. A process as claimed in claim 3, in which reinforcing fibres are included in the reaction mixture before the expanded mass is dried.

6. In a process for the production of a silicate body from a reaction mixture of lime and a reactive siliceous material in a weight ratio of silica:lime between about 1:5 and 4:1 suspended in water, the improvement which comprises heating the reaction mixture to a temperature between about 65° C. and about 100° C. and; including in the reaction mixture at atmospheric pressure ions of at least one of the metals selected from the group consisting of aluminium, nickel and zirconium, said ions being produced from a metal compound selected from the group consisting of sulphates and alums, and said ions being included in a concentration, based on the water content of the total reaction mixture, of more than 0.5 g. per litre; whereby an expanded mass is produced, and drying the expanded mass produced.

7. In a process for the production of a silicate body from a reaction mixture of lime and a reactive siliceous material in a weight ratio of silica:lime between about 1:5 and 4:1 suspended in water, the improvement which comprises heating the reaction mixture at atmospheric pressure to a temperature between about 80° C. and 100° C. and including in the reaction mixture ions of at least one of the metals selected from the group consisting of aluminium, nickel and zirconium in a concentration, based on the water content of the total reaction mixture, of more than 0.25 g. per litre, whereby an expanded mass is produced, and drying the expanded mass produced at about 100 to 400° C.

8. In a process for the production of a silicate body from a reaction mixture of lime and a reactive siliceous material in a weight ratio of silica:lime between about 1:5 and 4:1 suspended in water, the improvement which comprises heating the reaction mixture at atmospheric pressure at about 90 to 100° C., and including in the reaction mixture ions of at least one of the metals selected from the group consisting of aluminium, nickel and zirconium in a concentration, based on the water content of the total reaction mixture, of more than 0.25 g. per litre, whereby an expanded mass is produced, and drying the expanded mass produced at 100 to 400° C.

References Cited by the Examiner

UNITED STATES PATENTS

| | | | |
|---|---|---|---|
| 1,622,396 | 3/1927 | Schneck | 106—87 |
| 1,844,662 | 2/1932 | King | 106—87 |
| 1,867,180 | 7/1932 | Schwalz | 106—120 |
| 1,954,117 | 4/1934 | Caldwell | 106—87 |
| 1,965,538 | 7/1934 | Stewart | 196—87 |
| 2,005,069 | 6/1935 | Bernier | 106—87 |
| 2,135,542 | 11/1938 | Knibbs et al. | 106—89 |
| 2,400,884 | 5/1946 | Lloyd | 106—120 |
| 2,421,721 | 6/1947 | Smith et al. | 106—120 |
| 2,469,379 | 5/1949 | Fraser | 106—120 |
| 2,517,235 | 8/1950 | Pierce | 106—120 |
| 2,540,354 | 2/1951 | Selden | 106—120 |
| 2,698,251 | 12/1954 | Shea et al. | 106—120 |
| 2,699,097 | 1/1955 | Binkley | 106—120 |
| 2,716,070 | 8/1955 | Seipt | 106—120 |
| 2,754,547 | 7/1956 | Allen | 106—120 |
| 2,898,220 | 8/1959 | Ulfstedt et al. | 106—120 |
| 2,944,911 | 7/1960 | Muller et al. | 106—120 |
| 3,062,669 | 11/1962 | Dilnot | 106—120 |

TOBIAS E. LEVOW, *Primary Examiner.*

UNITED STATES PATENT OFFICE
CERTIFICATE OF CORRECTION

Patent No. 3,238,052            March 1, 1966

Nathan Burak et al.

It is hereby certified that error appears in the above numbered patent requiring correction and that the said Letters Patent should read as corrected below.

Column 9, line 25, for "strnegth" read -- strength --; column 10, line 34, for "194 kg./cm.$^3$" read -- 194 kg./m.$^3$ --; column 11, line 29, strike out "maceous earth having a specific surface area of about 200".

Signed and sealed this 18th day of April 1967.

(SEAL)
Attest:

ERNEST W. SWIDER           EDWARD J. BRENNER
Attesting Officer           Commissioner of Patents